(12) United States Patent
Helwig

(10) Patent No.: US 9,809,151 B2
(45) Date of Patent: Nov. 7, 2017

(54) ADJUSTMENT DEVICE FOR AIMING TWO OPPOSITELY PIVOTED LAMP ELEMENTS OF A MOTOR VEHICLE

(71) Applicant: FORD GLOBAL TECHNOLOGIES, LLC, Dearborn, MI (US)

(72) Inventor: Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 14/563,466

(22) Filed: Dec. 8, 2014

(65) Prior Publication Data
US 2016/0159271 A1 Jun. 9, 2016

(51) Int. Cl.
*B60Q 1/06* (2006.01)
*B60Q 1/08* (2006.01)
*B60Q 1/068* (2006.01)
*B60Q 1/04* (2006.01)

(52) U.S. Cl.
CPC ............ *B60Q 1/08* (2013.01); *B60Q 1/0683* (2013.01); *B60Q 1/0433* (2013.01); *B60Q 2200/32* (2013.01); *B60Q 2200/36* (2013.01); *B60Q 2200/38* (2013.01)

(58) Field of Classification Search
CPC .... B60Q 1/08; B60Q 1/0683; B60Q 2200/36; B60Q 2200/38; B60Q 1/0433; B60Q 1/12; B60Q 1/06; B60Q 1/068; B60Q 1/124; B60Q 2200/30; B60Q 2200/32
See application file for complete search history.

(56) References Cited

U.S. PATENT DOCUMENTS

| 4,954,933 A | 9/1990 | Wassen |
| 7,611,268 B2 | 11/2009 | Flynn et al. |
| 2014/0003080 A1* | 1/2014 | King .................... B60Q 1/0683 362/525 |
| 2014/0029288 A1* | 1/2014 | King .................... B60Q 1/0683 362/523 |
| 2015/0016137 A1* | 1/2015 | Takii .................... B60Q 1/0041 362/523 |

FOREIGN PATENT DOCUMENTS

| CN | 101956958 B | 1/2013 |
| CN | 101823457 B | 7/2013 |
| DE | 10211816 B4 | 5/2014 |

(Continued)

OTHER PUBLICATIONS

English machine translation of CN101823457.
(Continued)

*Primary Examiner* — Y M. Lee
(74) *Attorney, Agent, or Firm* — Jason Rogers; King & Schickli, PLLC

(57) ABSTRACT

An adjustment device is provided for aiming two oppositely pivoted lamp elements. That device includes a single aim adjuster screw, a first connection connecting the adjuster screw to a first lamp element and a second connection connecting the adjuster screw to a second lamp element. One turns the adjuster screw to simultaneously pivot the first and second lamp elements in opposite directions and thereby aim the two lamp elements in a synchronous manner.

9 Claims, 1 Drawing Sheet

(56) References Cited

FOREIGN PATENT DOCUMENTS

| | | | |
|---|---|---|---|
| EP | 2436557 | A3 | 10/2012 |
| KR | 100435711 | B1 * | 6/2004 |
| WO | 2013075916 | A1 | 5/2013 |

OTHER PUBLICATIONS

English machine translation of CN101956958.
English machine translation of DE10211816.
English machine translation of EP2436557.
English machine translation of WO2013075916.

* cited by examiner

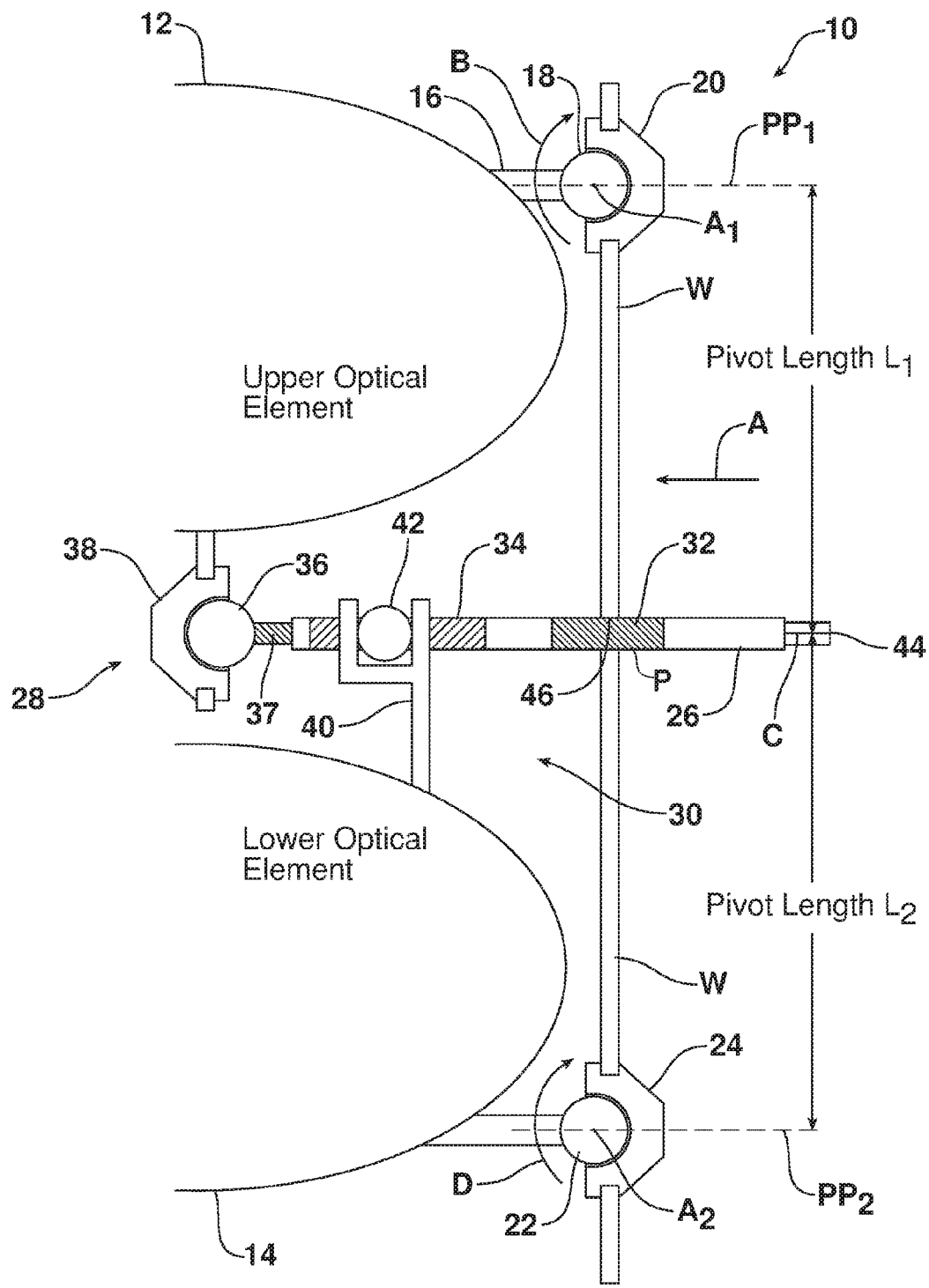

ADJUSTMENT DEVICE FOR AIMING TWO OPPOSITELY PIVOTED LAMP ELEMENTS OF A MOTOR VEHICLE

TECHNICAL FIELD

This document relates generally to vehicle headlamps and more particularly, to an adjustment device for aiming two oppositely pivoted lamp elements of a motor vehicle.

BACKGROUND

Motor vehicles are equipped with headlamps to illuminate the road during low visibility conditions. In the past, vehicles have generally employed two headlamps, one mounted on either side at the front of the vehicle. However, in recent years there has been a proliferation of more complex headlamps systems and many motor vehicles now feature at least two lamp elements on each side.

In one possible arrangement, the multiple lamp elements on each side of the vehicle are oppositely pivoted about two different pivot planes. In order to meet regulations these two lamp elements must move in a synchronous manner. In the past complicated mechanisms have been utilized to meet this requirement. This is because different pivot lengths (distance from pivot point to adjuster screw locations), opposite direction of movement needs and package constraints all limit the ability to deliver a cost-effective, robust aiming mechanism. This document relates to a new and improved adjustment device for aiming two oppositely pivoted lamp elements that is simple and inexpensive in construction and that provides a cost-effective and reliable aiming system.

SUMMARY

In accordance with the purposes and benefits described herein, an adjustment device is provided for aiming two oppositely pivoted lamp elements of a motor vehicle headlamp system. That adjustment device comprises an aim adjuster screw, a first connection connecting the adjuster screw to a first lamp element whereby the first lamp element is pivoted in a first direction and a second connection connecting the adjuster screw to a second lamp element whereby the second lamp element is pivoted in a second direction. Advantageously, the adjuster device allows the first and second lamp elements to be aimed in a synchronous manner with a single input made through the adjuster screw.

In one possible embodiment, the adjuster screw includes a first portion with a first thread and a second portion with a second thread wherein the second thread is opposite the first thread. The second connection is connected to the adjuster screw through the second thread.

In one possible embodiment the first lamp element has a first pivot plane, a first pivot length $L_1$ from the adjuster screw and the second lamp element has a second pivot plane, a second pivot length $L_2$ from the adjuster screw. Further the first thread has a pitch equal to P and the second thread has a pitch equal to $P+L_2/L_1 \cdot P$, with opposite hand threading.

In one possible embodiment, the first connection includes a ball and socket wherein the ball is threaded onto the adjuster screw. Further the second connection includes a cylindrical nut engaging the second thread. Still further the first pivot plane includes a first ball and socket and the second pivot plane includes a second ball and socket. These two ball and sockets connect the respective first and second lamp elements to a mounting wall of the lamp housing.

Still further, the arm adjuster screw includes an initial synchronization thread. The position of the first ball is adjusted on the synchronization thread at the assembly plant in order to provide initial synchronization of the two lamp elements through the center of the aim adjuster screw, or from the front of the ball.

In accordance with yet another aspect, a method is provided for aiming two oppositely pivoted lamp elements by means of a single adjuster screw. That method may be broadly described as comprising the turning of the adjuster screw to pivot a first lamp element in a first direction and a second lamp element in a second, opposite direction so that the first and second lamp elements are aimed in a synchronous manner. In addition, the method includes the step of adjustably connecting a first lamp of the two lamp elements to the adjuster screw at assembly so as to provide initial synchronization of the two lamp elements through the center of the adjuster screw, or from the front of the ball.

In the following description, there are shown and described several preferred embodiments of the adjustment device and its related method. As it should be realized, the adjustment device and the method are capable of other, different embodiments and their several details are capable of modification in various, obvious aspects all without departing from the device and method as set forth and described in the following claims. Accordingly, the drawings and descriptions should be regarded as illustrative in nature and not as restrictive.

BRIEF DESCRIPTION OF THE DRAWING FIGURE

The accompanying drawing FIGURE incorporated herein and forming a part of the specification, illustrates several aspects of the adjustment device and together with the description serve to explain certain principles thereof.

FIG. 1 comprises a schematic illustration of the adjustment device including the single aim adjuster screw and the respective first and second connections that connect that adjuster screw to the respective first and second lamp elements that are pivoted in opposite directions and aimed in a synchronous manner.

Reference will now be made in detail to the present preferred embodiment of the adjustment device and its related method, examples of which are illustrated in the accompanying drawing FIGURE.

DETAILED DESCRIPTION

Reference is now made to FIG. 1 illustrating the adjustment device 10 for aiming to oppositely pivoted lamp elements 12, 14. More specifically, in the illustrated embodiment the first lamp element 12 comprises an upper optical element while the second lamp element 14 comprises a lower optical element. Thus, the illustrated embodiment relates to a motor vehicle incorporating two stacked lamp elements 12, 14 on each side of the motor vehicle.

The first lamp element 12 is carried on two arms 16 of two aligned balls 18 received in sockets 20 secured to a mounting wall W of the headlamp housing (only one arm, one ball and one socket is shown in the FIGURE, the second arm, ball and socket are directly behind the ones illustrated). Thus it should be appreciated that the first lamp element 12 has a pivot plane $PP_1$ extending through the ball 18 and socket 20 that pivots about an axis $A_1$ extending through the center of the ball 18.

The second lamp element 14 is secured to the vehicle mounting wall W by means of the two balls 22 and two cooperating sockets 24 (only one ball and socket are illustrated, the other ball and socket are directly behind those illustrated and are not visible in this FIGURE). Thus it should be appreciated that the second lamp element 14 has a second pivot plane $PP_2$ extending through the ball 22 and socket 24 that pivots about an axis $A_2$ extending through the center of the ball 22. As should be appreciated, the first lamp element 12 and second lamp element 14 are oppositely pivoted and must be moved in opposite directions in order to aim the two lamps elements in a synchronous manner.

The adjustment device 10 may be broadly described as including a single aim adjuster screw 26, a first connection 28, connecting the adjuster screw to the first lamp element 12 whereby the first lamp element is pivoted in a first direction, and a second connection 30, connecting the adjuster screw to the second lamp element 14 whereby the second lamp element is pivoted in a second direction.

The adjuster screw 26 includes a first portion/first thread 32 and a second portion/second thread 34 wherein the second thread is opposite to the first thread. Thus, where the first thread 32 is clockwise, the second thread 34 is counterclockwise. Alternatively, where the first thread 32 is counterclockwise, the second thread 34 is clockwise.

In the illustrated embodiment, the first connection 28 comprises a first ball 36 and first socket 38. As illustrated the first ball 36 is threaded onto the initial synchronization thread 37 at the distal end of the adjuster screw 26 while the first lamp element 12 is carried on an arm or support 40 connected to the first socket 38. More specifically, the first ball 36 is adjusted and set in position on the synchronization thread 37 at the lamp manufacturing plant so as to provide an initial synchronization of both lamp elements 12, 14 through the center of the arm adjuster screw 26, or from the front of the ball 36.

In contrast, the second connection 30 comprises a support bracket 40 holding a threaded cylindrical nut 42 that engages the second thread 34 of the adjuster screw 26.

In order to aim the two oppositely pivoted lamp elements 12, 14, one engages the input end 44 of the adjuster screw 26 with an appropriate tool such as a screwdriver, Allen wrench or wrench. As should be appreciated the first thread 32 of the adjuster screw 26 engages in a threaded opening 46 in the mounting wall W in the illustrated embodiment. When the adjuster screw 26 is turned in a clockwise direction, the adjuster screw 26 moves in the direction of action arrow A through the wall W causing the first lamp element 12 and first pivot plane $PP_1$ to pivot in the direction of action arrow B about the first pivot axis $A_1$ thereby raising the aim of the first element.

In order to synchronize the aiming of the first and second lamp elements 12, 14, the second lamp element 14 must be pivoted the same angular amount as the first lamp element 12 but in the opposite direction. In order to meet this goal, the first thread 32 has a pitch equal to P while the second thread 34 has a pitch equal to $P+L_2/L_1 \cdot P$ with opposite hand threading. When $L_1=L_2$ the second thread 34 is twice the pitch of the first thread 32 in the opposite direction to counteract (a) the movement in direction A made by the adjuster screw 26 through the mounting wall W and (b) then move the second lamp element 14 on the support bracket 40 an appropriate distance in the opposite direction so that the second lamp element 14 is pivoted the same angular amount as the first lamp element 12 but in the opposite direction.

As should be further appreciated, synchronous movement of the first and second lamp elements 12, 14 also requires that the pivot length be taken into consideration. In the illustrated embodiment, the first lamp element 12 has a first pivot length $L_1$ extending from the center C of the adjuster screw 26 to the first pivot plane $PP_1$. Further, the second lamp element 14 has a second pivot length $L_2$ extending from the centerline and see of the adjuster screw 26 to the second pivot plane $PP_2$. In the illustrated embodiment the pivot length $L_1$ is equal to the pivot length $L_2$. Thus, the adjustment ratio $(L_1/L_2)=1$. However, in other headlight assemblies the pivot lengths $L_1$, $L_2$ may differ. One uses the ratio $L_1/L_2$ to accommodate and compensate for the pivot lengths $L_1$ and $L_2$ of the lamp elements 12, 14 and thereby ensure synchronous adjustment of the aim of those lamps.

As a result of the ratio of the two threads 32, 34, the second lamp element 14 and second pivot plane $PP_2$ are pivoted in the direction of action arrow D about the second pivot axis $A_2$. Thus, it should be appreciated that both lamp elements 12, 14 may be raised and lowered together with a single input through the adjuster screw 26.

As should be appreciated from the above description, the adjustment device allows the aiming of two oppositely pivoted lamp elements by means of a single adjuster screw 26. Thus, the adjustment device 10 is associated with a headlamp aiming method which may be broadly described as comprising the step of turning the adjuster screw 26 to simultaneously pivot the first lamp element 12 in a first direction and the second lamp element 14 in a second, opposite direction so that the two lamp elements are aimed in a synchronous manner.

In summary, numerous benefits result from the device 10 which comprises a relatively simple and inexpensive construction that advantageously allows quick and efficient adjustment of the aiming of two oppositely pivoted lamp elements 12, 14 through input provided through a single adjustment screw 26.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An adjustment device for aiming two oppositely pivoted lamp elements, comprising:
   an aim adjuster screw having a first portion with a first thread and a second portion with a second thread wherein said second thread is opposite in direction to said first thread;
   a first connection connecting said adjuster screw to a first lamp element whereby said first lamp element is pivoted in a first direction; and
   a second connection connecting said adjuster screw to a second lamp element whereby said second lamp element is pivoted in a second direction and said first and second lamp elements are aimed in a synchronous manner.

2. The device of claim 1, wherein said second connection is threadedly connected to said adjuster screw through said second thread.

3. The device of claim 2, wherein said first lamp element has a first pivot plane including a first ball and socket, said first pivot plane having a first pivot length $L_1$ extending from the center of said adjuster screw to the center of the first ball and socket and said second lamp element has a second pivot plane including a second ball and socket, said second pivot plane having a second pivot length $L_2$ extending from the center of said adjuster screw to the center of the second ball and socket.

4. The device of claim 3, wherein said first thread has a pitch equal to P and said second thread has a pitch equal to $P+L_2/L_1 \cdot P$, with opposite hand threading.

5. The device of claim 4, wherein said first connection includes a third ball and socket wherein said ball is threaded onto said adjuster screw.

6. The device of claim 5, wherein said second connection includes a cylindrical nut engaging said second thread.

7. The device of claim 4, wherein said first ball and socket and said second ball and socket respectively connect said first and second lamp elements to a mounting wall of a lamp housing.

8. The device of claim 7, wherein said aim adjuster screw further includes an initial synchronization thread and said third ball is connected to said aim adjuster screw by means of said initial synchronization thread.

9. The device of claim 8, wherein said aim adjuster screw has said initial synchronization thread at a first end and an input end at a second end.

* * * * *